Patented May 31, 1938

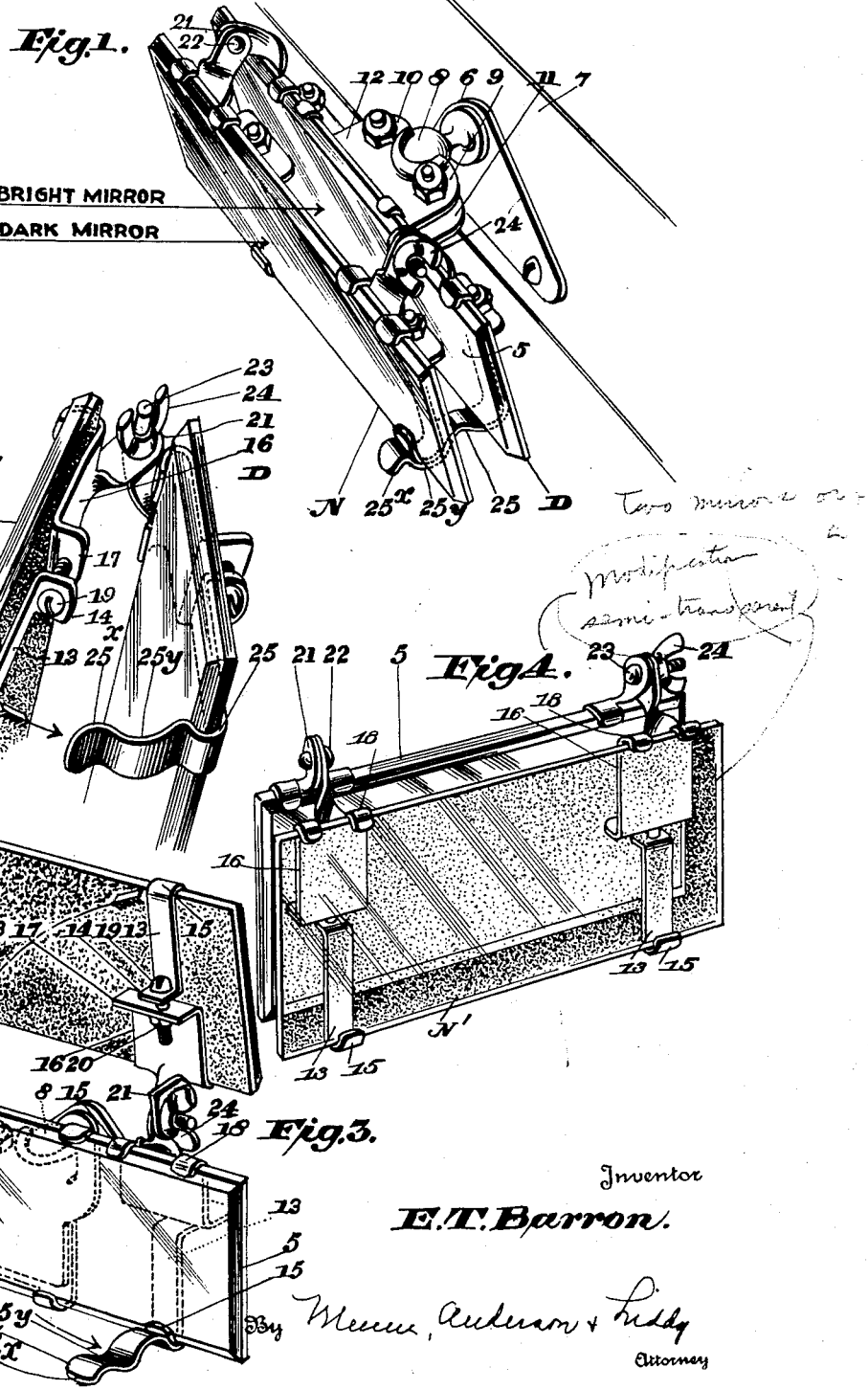

2,118,962

UNITED STATES PATENT OFFICE 2,118,962

ATTACHMENT FOR AUTOMOBILE MIRRORS

Edward T. Barron, Minneapolis, Minn.

Application October 5, 1936, Serial No. 104,143

1 Claim. (Cl. 88—77)

My invention relates to improvements in automobile mirrors, and it consists in the combinations, constructions, and arrangements herein described and claimed.

An object of my invention is to provide an auxiliary mirror for use in night driving which can be attached to the ordinary mirror that comes as the regular equipment of an automobile, and in which the auxiliary mirror may be held normally out of position, but which can be brought instantly into proper position for night driving, i. e., into parallelism with the ordinary mirror.

A further object of the invention is to provide a device of the class described in which the auxiliary mirror may be swung into position before the ordinary mirror for driving in daylight and will be held in parallelism and kept from rattling.

A further object of the invention is to provide simple holding devices for effecting both of the objects named above.

Other objects and advantages will appear in the following specification and the novel features of the invention will be particularly pointed out in the appended claim.

My invention is illustrated in the accompanying drawing, in which:

Figure 1 is a perspective view showing the position of the mirror for night driving, Figure 2 is a perspective view showing the latching and spacing means for the darkened auxiliary mirror, Figure 3 is a view showing the relative positions of the two mirrors for daylight driving, and Figure 4 is a perspective view showing a modified form of plate swung down in parallelism with the ordinary mirror in position for night driving.

In carrying out my invention I make use of a standard mirror 5 which is of the ordinary shape and which is intended for daylight driving. The mirror is held by a bracket having a base plate 6 which is secured to the frame 7 of the automobile. Borne by the base plate 6 is a ball member 8 of a universal joint which is partly formed by flanges 9 and 10 of opposed holding members 11 and 12, respectively. The construction thus far described is ordinary and forms no part of the present invention.

Referring to the drawing, it will be seen that on the backs of both mirrors and near each end of each mirror is a strap member 13 having a laterally bent end 14 and provided with a hook-like portion 15 arranged to engage one edge of the mirror.

Cooperating with each strap member 13 is a plate 16 having a laterally bent portion 17 and being provided with hooks 18 to engage the opposite edge of the mirror from the hook 15. A screw 19 passes through the spaced-apart bent portions 14 and 17 and a nut 20 draws the strap and plate portions together.

Each plate portion has an integral hinge portion 21 between the hooks 18, these hinge portions being twisted into planes at right angles to the planes of the mirrors, a pair of the hinge portions at one end of the two mirrors being pivotally connected together by a rivet 22. The other pair of hinge portions at the other ends of the mirrors are preferably connected together by a screw bolt 23 having a wing nut 24 by means of which a proper hinging tension may be secured, thus forming a clamp.

It will be noted that the hook portion 15 of one of the straps 13 of the ordinary or daylight mirror has an integral spacing and latching member 25. This spacing and latching member is made in the form of a double bend of spring metal. As will be observed from Fig. 2, the free end 25x is bent downwardly to afford a cam surface for engagement with the hook portion 15 of the night-driving mirror. It will also be observed that there is a bowed portion which constitutes a trough 25y for holding the hook portion 15 of the strap 13 of the night-driving mirror. This trough 25y is so gaged that when the night mirror is swung into position for use it will be exactly in parallelism with the ordinary mirror used for daylight driving.

From the foregoing description of the various parts of the device, the operation thereof may be readily understood. Each mirror is held by tightening the screws, such as 19, and they are pivoted together as stated. Normally the daylight-driving mirror is in view, the auxiliary, night-driving mirror being swung upwardly and rearwardly, as shown in Fig. 3. One now driving can look in the mirror D and see through the rear window whether a car is approaching or about to pass.

Now when it becomes dark and the bright lights are turned on, the night-driving mirror N is swung downwardly. When the hook 15 (see Fig. 2) reaches the end of the latching and spacing member the latter is bent outwardly and when the hook portion 15 reaches the trough 25y then the mirror is held in position in parallelism with the daylight mirror D. The action of swinging this night-driving mirror downwardly and the clamping of the mirror in position may be done very quickly. The darkened night-driving mirror will then be in precisely the same relation as the daylight-driving mirror D, there being no necessity of adjustment to find the reflection of the rear window.

Since the spacing and latching member 25 is made of spring metal, an outward pull on the night-driving mirror N will release the latter when it can be swung up, back out of position, as shown in Fig. 3. Tension of the hinge 21 is adjusted as stated by means of the wing nut 24, so that the night-driving mirror can be lifted out of position but can be instantly brought into position when it is swung down as stated.

In Fig. 4, I have shown a modified form for night driving. This is a transparent plate N' of any suitable material such as glass, celluloid, etc., which has been smoked or clouded, to reduce the glare. When this plate is swung into parallelism with the mirror D the effect is the same as that produced by the use of the mirror N.

I claim:

The combination of an automobile mirror for daylight driving, means for supporting the mirror in a fixed position, an auxiliary mirror for night driving adapted to be moved in front of the daylight mirror or away from the same, means for hingedly connecting the mirrors together including pairs of adjustable members for each mirror, said members having means engaging over an edge of the mirror, means for clamping pairs of the members on to the mirrors, one member of each of the pairs on one mirror being provided with a section of a hinge, a similar member of each of the pairs on the other mirror having a complementary hinge section, means for pivotally connecting the associated hinge sections together, one of the members of a pair on the daylight mirror having a projection adapted to engage the free edge of the auxiliary mirror for retaining said mirror in an operating position, one of the members of a pair on the daylight mirror having an extension projecting outwardly therefrom, the extension having a depression for receiving the free edge of the auxiliary mirror for latching said mirror in an operative position, the extension having a cam surface for flexing the extension away from its latching position when the auxiliary mirror is moved away from the daylight mirror.

EDWARD T. BARRON.